# (12) United States Patent
Zhang

(10) Patent No.: US 8,165,033 B1
(45) Date of Patent: Apr. 24, 2012

(54) METHOD AND APPARATUS FOR PERFORMING GENERALIZED PROCESSOR SHARING SCHEDULING

(75) Inventor: Jiefan Zhang, High Wycombe (GB)

(73) Assignee: Altera Corporation, San Jose, CA (US)

( * ) Notice: Subject to any disclaimer, the term of this patent is extended or adjusted under 35 U.S.C. 154(b) by 331 days.

(21) Appl. No.: 11/897,454

(22) Filed: Aug. 30, 2007

(51) Int. Cl.
    *G01R 31/08* (2006.01)
(52) U.S. Cl. ............... 370/252; 370/395.4; 370/411; 370/412
(58) Field of Classification Search ............ 370/252, 370/395.4, 411–412
    See application file for complete search history.

(56) References Cited

U.S. PATENT DOCUMENTS

| | | | |
|---|---|---|---|
| 5,455,825 A | 10/1995 | Lauer et al. | |
| 5,663,961 A | 9/1997 | McRoberts et al. | |
| 5,689,508 A | 11/1997 | Lyles | |
| 5,991,812 A | 11/1999 | Srinivasan | |
| 6,330,236 B1 | 12/2001 | Ofek et al. | |
| 6,370,144 B1 * | 4/2002 | Chao et al. | 370/395.42 |
| 6,389,031 B1 * | 5/2002 | Chao et al. | 370/412 |
| 6,396,843 B1 | 5/2002 | Chiussi et al. | |
| 6,829,218 B1 | 12/2004 | Chen et al. | |
| 6,891,834 B1 * | 5/2005 | Dally et al. | 370/395.4 |
| 6,895,012 B2 | 5/2005 | Amou et al. | |
| 7,110,411 B2 | 9/2006 | Saidi et al. | |
| 7,190,674 B2 | 3/2007 | Kobayakawa et al. | |
| 7,457,296 B2 * | 11/2008 | Kounavis et al. | 370/395.4 |
| 7,460,544 B2 * | 12/2008 | Jain et al. | 370/395.4 |
| 7,646,715 B2 * | 1/2010 | Oueslati et al. | 370/234 |
| 2006/0067325 A1 | 3/2006 | Kounavis et al. | |

OTHER PUBLICATIONS

Karanicolas (""A 15-b 1-Msample/s Digitally Self-Calibrated Pipeline ACD"" IEEE Journal of Solid-State Circuits, vol. 28, No. 12, Dec. 1993).*

* cited by examiner

*Primary Examiner* — Kibrom T Hailu
(74) *Attorney, Agent, or Firm* — L. Cho

(57) ABSTRACT

A scheduler includes a sorting unit that has n comparators to identify a smallest virtual finish time (VFT) value from $2^n$ VFT entries. Each of the VFT entries may include a valid bit to indicate its validity.

32 Claims, 10 Drawing Sheets

METHOD AND APPARATUS FOR PERFORMING GENERALIZED PROCESSOR SHARING SCHEDULING

TECHNICAL FIELD

Embodiments of the present invention relate to generalized processor sharing (GPS) schedulers. More specifically, embodiments of the present invention relate to a method and apparatus for performing generalized processor sharing scheduling of data packets by sorting virtual finish times.

BACKGROUND

Current scheduling methods used for allocating limited network resources such as network bandwidth include GPS related scheduling algorithms and Round-Robin related scheduling algorithms. Round-Robin related scheduling algorithms typically allocate bandwidth on a rotating basis. When there is great variance in the sizes of data packets, Round-Robin related scheduling algorithms have been found to allocate bandwidth unfairly. GPS related scheduling algorithms include Weighted Fair Queuing (WFQ), Worst-Case Fair Weighted Fair Queuing (WF2Q), and Self Clocked Fair Queuing (SCFQ). GPS related scheduling algorithms compute a virtual start and finish time to each packet and schedule packets having virtual finish times that are smallest.

In order to identify the packet with the smallest virtual finish time, GPS related schedulers typically utilize a sorter. For practical applications today such as a 10 Gbps network node with 128 inputs, the sorter needs to make a scheduling decision 20 million times a second. Thus, the sorter needs to identify a smallest virtual finish time among 128 numbers in 50 ns.

Traditional software solutions used for performing sorting were found to be effective only in low throughput situations. Traditional hardware approaches typically involved building a parallel comparing tree. These hardware solutions required a large number of resources and limited the GPS related scheduler to a few number of queues.

SUMMARY

According to an embodiment of the present invention, a hardware scheduler is disclosed that utilizes a reduced number of comparators to sort virtual finish times (VFTs) of data packets at queues for scheduling. The scheduler is a folded tree structure that utilizes n comparators to sort $2^n$ VFT values. The n comparators form a comparator tree of n levels. Each of the n levels has a dedicated comparator from the n comparators to compare one or more pairs of VFT values at each level. Each VFT value has a corresponding valid bit to identify the validity of the value. Each comparator identifies a smaller valid VFT value from each of the one or more pairs at its level. The comparators at each level of the comparator tree operate concurrently in a pipelined fashion. By utilizing a valid bit, the scheduler is able to successfully allocate spare bandwidth from queues temporarily empty to busy queues proportional to their bandwidth weights.

BRIEF DESCRIPTION OF THE DRAWINGS

The features and advantages of the present invention are illustrated by way of example and are by no means intended to limit the scope of the present invention to the particular embodiments shown.

DETAILED DESCRIPTION

In the following description, for purposes of explanation, specific nomenclature is set forth to provide a thorough understanding of embodiments of the present invention. It will be apparent to one skilled in the art that specific details in the description may not be required to practice the embodiments of the present invention. In other instances, well-known circuits, devices, and procedures are shown in block diagram form to avoid obscuring embodiments of the present invention unnecessarily.

Figure 1:
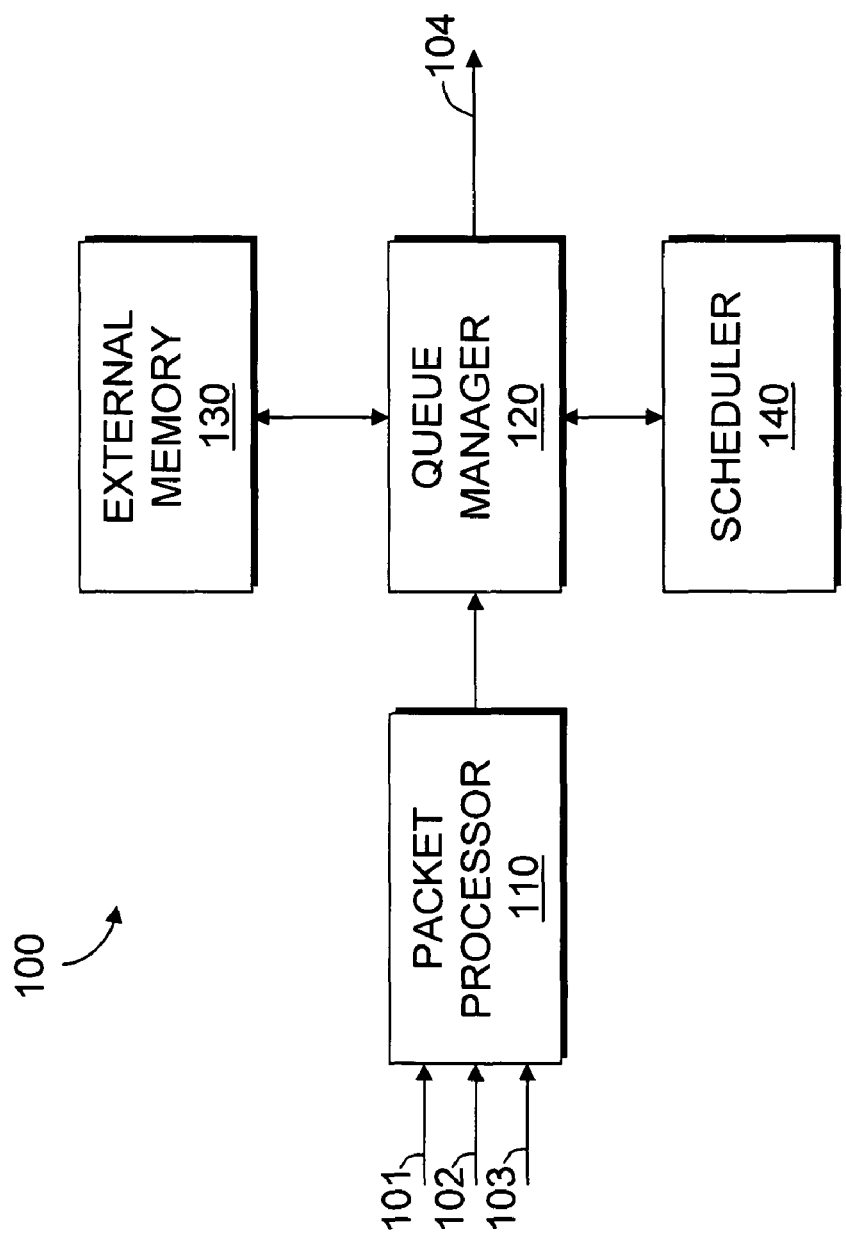
FIG. 1 is a block diagram illustrating a network node according to an exemplary embodiment of the present invention.

FIG. 1 is a block diagram illustrating a network node 100 according to an exemplary embodiment of the present invention. The network node 100 includes a packet processor 110. The packet processor 110 receives data packets from a plurality of network connections 101-103. The packet processor 110 may operate to classify a data packet based on internet protocol (IP) source address, IP destination address, application of the packet, or other criteria. The packet processor 110 may assign a data packet to a particular queue based on the classification of a packet.

The network node 100 includes a queue manager 120. The queue manager 120 coordinates the storage of the data packets into queues assigned by the packet processor 110. According to an embodiment of the present invention, the queues may reside in external memory 130. The external memory may be implemented by synchronous dynamic random access memory (SDRAM) or other memory device.

The network node 100 includes a scheduler 140. The scheduler 140 receives information regarding a packet at the top of each of the queues in external memory 130 from the queue manager. The scheduler 140 determines an order in which to transmit the packets received. According to an embodiment of the present invention, information regarding the packets is transmitted from the queue manager 120 to the scheduler 140 in a serial fashion. The scheduling decision made by the scheduler 140 is transmitted back to the queue manager 120. The queue manager 120 may accordingly send the packet nominated by the scheduling decision to output port 104.

Figure 2:
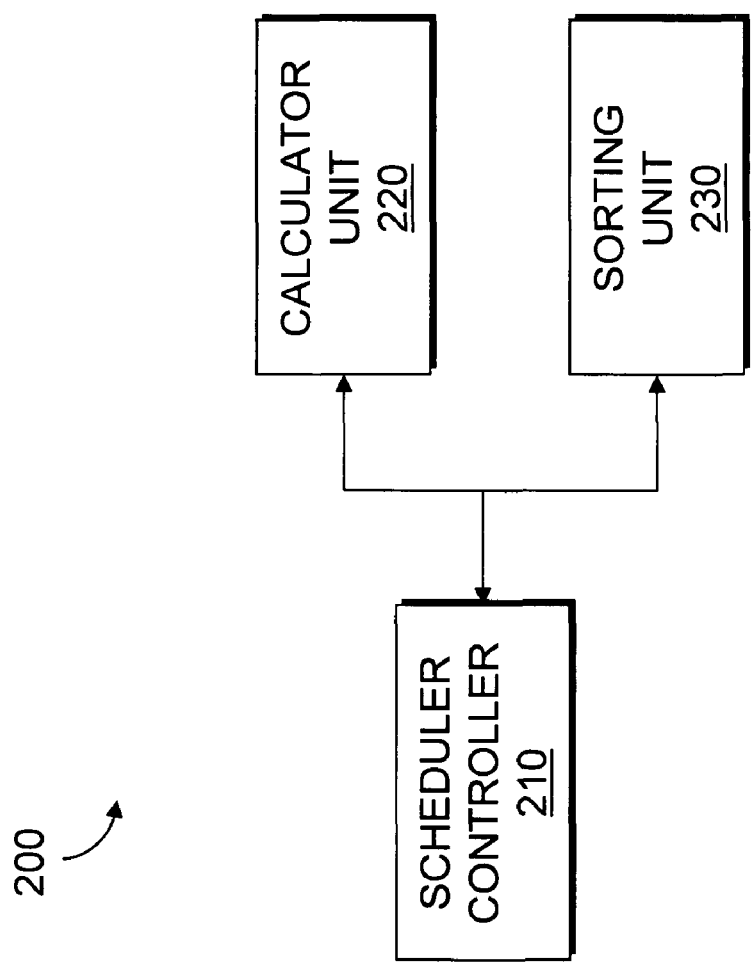
FIG. 2 is a block diagram of a scheduler according to an exemplary embodiment of the present invention.

FIG. 2 is a block diagram of a scheduler 200 according to an exemplary embodiment of the present invention. According to an embodiment of the present invention, the scheduler 200 may be implemented as the scheduler 140 shown in FIG. 1. The scheduler 200 includes a scheduler controller 210. The scheduler controller 210 is coupled to and transmits information between components in the scheduler 200. The scheduler controller 210 receives information regarding packets at the top of queues from a queue manager. According to an embodiment of the present invention, the information may include a length of a data packet, allocated bandwidth for a particular queue, and/or other information. The scheduler controller 210 also sends scheduling decision back to a queue manager.

The scheduler 200 includes a calculation unit 220. The calculation unit 220 computes a virtual finish time (VFT) of a data packet. The VFT may be referred to as a VFT value. According to an embodiment of the present invention VFTs may be computed using the following relationship.

VFT=VST+packet length/bandwidth

In the above relationship, VST represents virtual start time. The VST of a data packet may be a VFT of a previously scheduled data packet. Alternatively, the VST of a data packet may be a global virtual time (GVT) of a data packet when a queue from which the data packet is on is empty. The GVT may be a monotonic function of real time. The GVT may be approximated, for example, as being a value larger than the VSTs of all data packets which have been scheduled, and a value smaller than the VFTs of all data packets which have not been scheduled.

According to an embodiment of the present invention, there is a predetermined maximum packet length, predetermined minimum bandwidth, and a determined number. The difference between any VFT of a packet in the scheduler 200 is less than the determined number. This determined number is the maximum VFT difference.

The scheduler 200 includes a sorting unit 230. The sorting unit 230 receives the computed VFTs for each of the data packets in the queues. The sorting unit 230 sorts the VFTs and identifies a VFT with the smallest value. The sorting unit 230 forwards the identity of the data packet having the VFT with the smallest value to the scheduler controller 210 which prompts a queue manager to send out the data packet.

Figure 3:
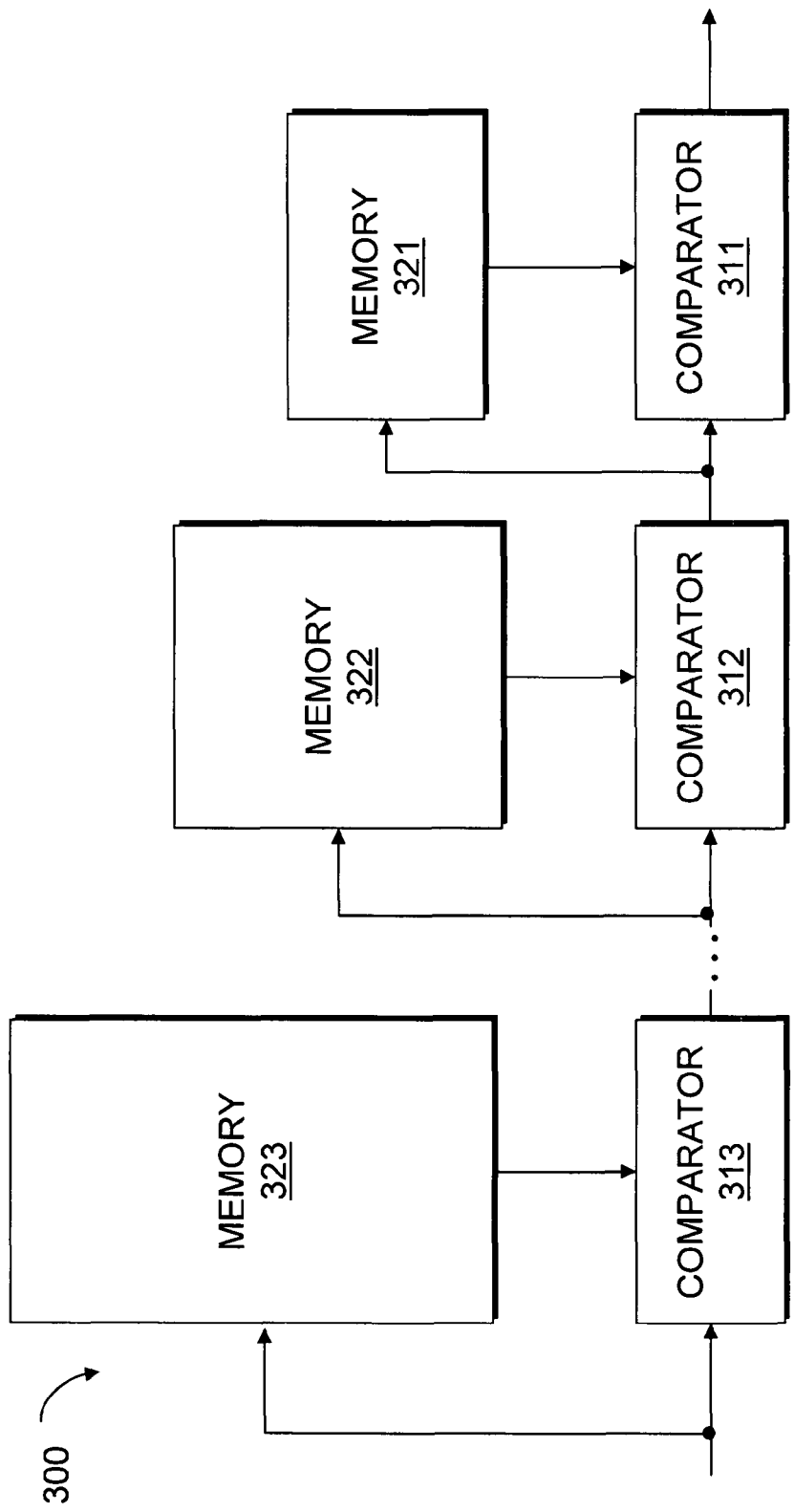
FIG. 3 is a block diagram of a sorting unit according to an exemplary embodiment of the present invention.

FIG. 3 is a block diagram of a sorting unit 300 according to an exemplary embodiment of the present invention. The sorting unit 300 may be used to implement the sorting unit 230 shown in FIG. 2. The sorting unit 300 includes a first comparator 311, a second comparator 312, and an nth comparator 313, where n can be any number. The first comparator 311 may be considered a level 1 comparator, the second comparator 312 may be considered a level 2 comparator, and the nth comparator 313 may be considered a level n comparator.

The sorting unit 300 includes a first memory 321, a second memory 322, and an nth memory 323. The first memory 321 may be considered a level 1 memory that corresponds to the first comparator 311. The second memory 322 may be considered a level 2 memory that corresponds to the second comparator 312. The nth memory 323 may be considered a level n memory that corresponds to the nth comparator 313. According to an embodiment of the sorting unit 300, the level 1 memory may store $2^1$ entries, the level 2 memory may store $2^2$ entries, and the level n memory may store $2^n$ entries.

The sorting unit 300 may be used to implement a folded tree structure to sort $2^n$ VFT values. The level n comparator at the nth level of the comparator tree may be used to sort $2^n$ VFT values. The level 2 comparator at the second level of the comparator may be used to sort $2^2$ VFT values. The level 1 comparator at the first level of the comparator may be used to sort $2^n$ VFT values. Because VFT is monotonic function in real time, a VFT may overflow any fix sized counter. According to an embodiment of the present invention, the memory bits used to store a VFT is one bit longer than the bits of maximum VFT difference. When a VFT overflows a counter, the remainder of the overflow is stored in the memory. At each level, as a new VFT value is received, the VFT value is written into its corresponding memory as a valid VFT value if it is a valid number and written into its corresponding memory as an invalid VFT value if it is invalid, and compared with another VFT value that is its pair. The comparator compares the received VFT value with its pair and identifies a smaller valid VFT value. Where both VFT values are invalid or both VFT values have the same value, the comparator may select one the VFT values as the smaller valid VFT value. The smaller valid VFT value identified is considered the "winner" and forwarded to a comparator at the next level and stored in a memory at the next level with its state of validity. It should be appreciated that the sorting unit 300 may utilize additional logic to store the winner prior to forwarding the VFT value to the next level. The comparator at the next level retrieves a VFT value that belongs in a pair with the winner. The comparator at this level compares the VFT value and identifies a smaller valid VFT value and forwards the winner to a next level, if present. The winner determined by the comparator at level 1 is the VFT value with the smallest value and its corresponding data packet is to be scheduled.

According to an embodiment of the present invention, once a data packet is scheduled, the scheduler controller 210 (shown in FIG. 2) feeds the next packet belonging to the same queue into the sorting unit 230 (shown in FIG. 2). If there are no more packets in this queue, the scheduler controller 210 feeds a dummy data packet with an invalid VFT value into the sorting unit 230. This dummy data packet invalidates the previous winner in the memories. The comparators at each level of the comparator tree operate concurrently in a pipelined fashion. Once a data packet flows to a next level, a data packet from another queue may be fed into the sorting unit 230. By utilizing a valid bit, the scheduler is able to successfully allocate spare bandwidth from queues temporarily empty to busy queues proportional to their bandwidth weights.

Figure 4:
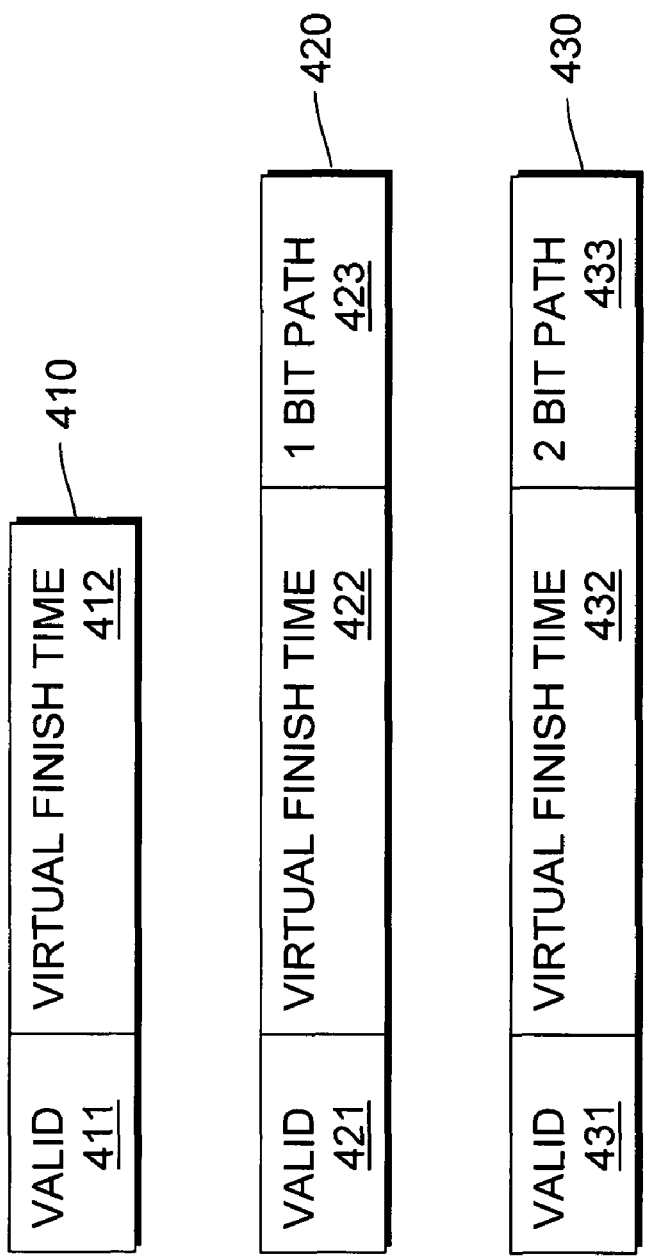
FIG. 4 illustrates exemplary virtual finish time entries as stored in memories according to an embodiment of the present invention.

In addition to storing the VFT value and a bit for indicating the VFT value's state of validity, the memories 321-323 in the sorting unit 300 may also store a bit path of a VFT value that identifies a branch in the comparator tree which the VFT value originated from. FIG. 4 illustrates exemplary VFT entries as stored in the memories. Entry 410 is an exemplary VFT entry stored at memory 323 shown in FIG. 3, where n is 3. The VFT entry 410 includes a valid bit 411 and a VFT value 412. Entry 420 is an exemplary VFT entry stored at memory 322 shown in FIG. 3, where n is 3. The VFT entry 420 includes a valid bit 421, a VFT value 422, and a 1 bit path 423. Entry 430 is an exemplary VFT entry stored at memory 321 shown in FIG. 3, where n is 3. The VFT entry 430 includes a valid bit 431, a VFT value 432, and a 2 bit path 433. The memory bits of VFT value 412, 422 and 432 are one bit longer than the bits of maximum VFT difference. This is, they should be able to store two times of the maximum VFT difference. When a VFT is overflow, the remainder of the overflow is stored in its VFT value memory location.

Figure 5:
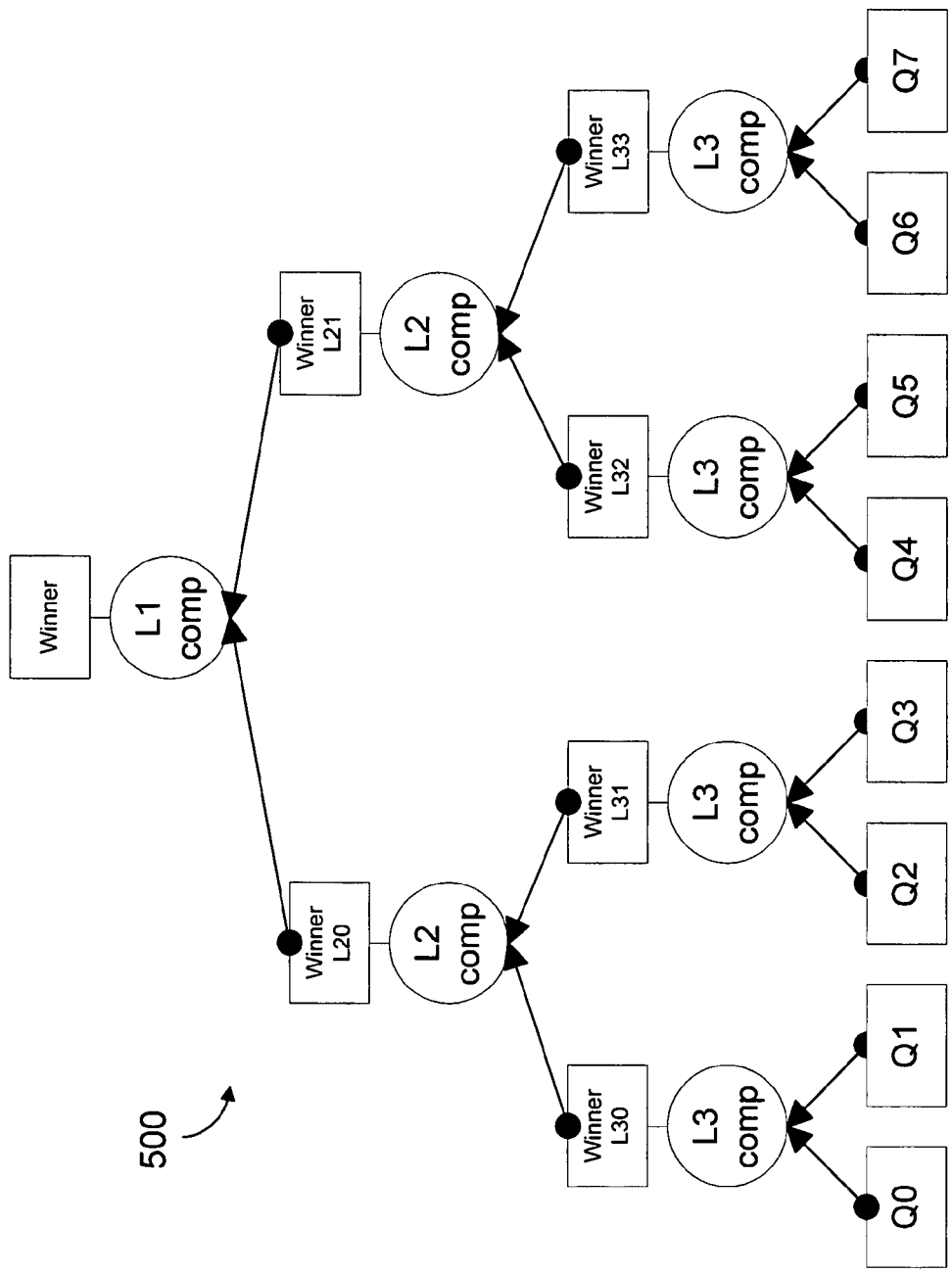
FIG. 5 illustrates a logical representation of a sorting unit according to an exemplary embodiment of the present invention.

FIG. 5 illustrates a logical representation of a sorting unit 500 according to an exemplary embodiment of the present invention. In this example, the sorting unit 500 includes 3 comparators that form a folded tree structure to compare 8 VFT values. With reference to FIG. 3, comparator 313 may be used to implement the level 3 comparators labeled as "L3 comp". The level 3 comparator is used to compare a VFT value received with its corresponding pair stored in memory. As shown, at this level, pairs are arranged from sibling queues. Queue Q0 and Q1 are sibling queues, queue Q2 and Q3 are sibling queues, queue Q4 and Q5 are sibling queues, and queue Q6 and Q7 are sibling queues. It should be appreciated that the VFT values from Q0-Q7 may be obtained directly from a calculator unit or scheduler controller or from a memory in the sorting unit such as memory 323.

VFT values that are determined to be the smallest from a pair by the level 3 comparator are designated as winners. When comparing VFT values from Q0 and Q1, a Winner L30 is determined. When comparing VFT values from Q2 and Q3, a Winner L31 is determined. When comparing VFT values from Q4 and Q5, a Winner L32 is determined. When comparing VFT values from Q6 and Q7, a Winner L33 is determined. A winning VFT value from level 3 is forwarded to the level 2 comparator labeled "L2 comp" and is also stored in a memory such as memory 322 shown in FIG. 3. With reference to FIG. 3, comparator 312 may be used to implement the level 2 comparator. The level 2 comparator is used to compare a winning VFT value received with its corresponding pair stored in memory. At this level, pairs are also arranged from sibling queues. Winner L30 is paired with Winner 31. Winner L32 is paired with Winner L33.

VFT values that are determined to be the smallest from a pair by the level 2 comparator are designated as winners. When comparing VFT values from Winner L30 and Winner L31, a Winner L20 is determined. When comparing VFT values from Winner L32 and Winner L33, a Winner L21 is determined. A winning VFT value from level 2 is forwarded to the level 1 comparator labeled "L1 comp" and is also stored in a memory such as memory 321 shown in FIG. 3. With reference to FIG. 3, comparator 311 may be used to implement the level 1 comparator. The level 1 comparator is used to compare a winning VFT value received with its corresponding pair stored in memory. At this level, Winner L20 is paired with Winner L21. The VFT value determined to be the smallest from the pair from the level 1 comparator is designated as the winner and is to be scheduled.

Figure 6:
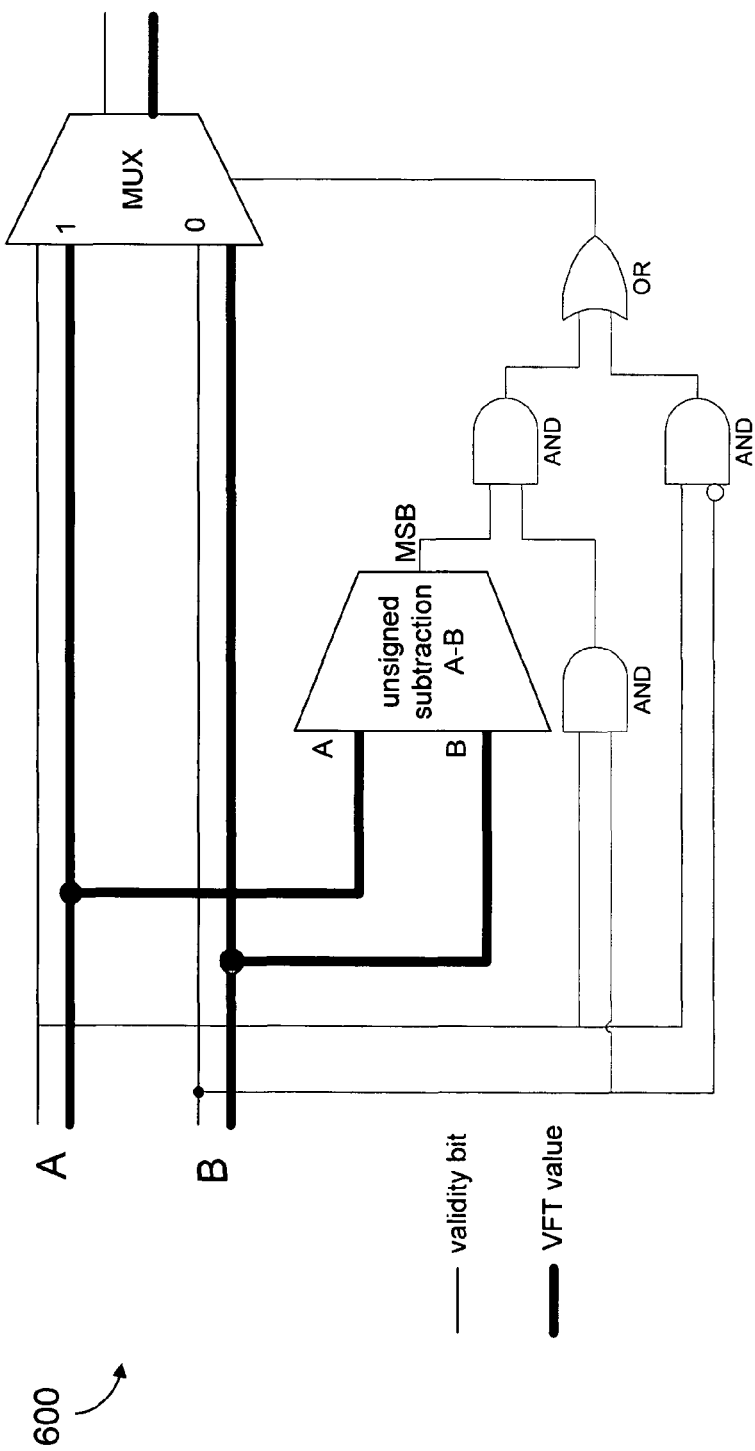
FIG. 6 illustrates a comparator according to an exemplary embodiment of the present invention.

FIG. 6 illustrates a comparator 600 according to an exemplary embodiment of the present invention. The comparator 600 may be used to implement comparator 311, 312, or 313 shown in FIG. 3. The comparator 600 compares a first VFT value and valid bit value corresponding to a first data packet (A), which is the winner of a previous level (if present), with a second VFT value and a valid bit value corresponding to a second data packet (B), which is the entry read from memory and paired with first data packet (A).

The comparator 600 produces the following results. If the VFT values for both A and B are invalid, the VFT value for B is determined to be the smaller. If the VFT value for A is valid and the VFT value for B is invalid, the VFT value for A is determined to be the smaller. If the VFT value for A is invalid and the VFT value for B is valid, the VFT value for B is determined to be smaller. If the VFT values for A and B are both valid and the Most Significant Bit (MSB) of the difference of (A-B) is 1, the VFT value for A is determined to be smaller. Otherwise, the VFT value for B is determined to be smaller. The comparator 600 achieves these results by forming the following logic equation.

If ((valid A and valid B and MSB of (A−B) is 1) or (valid A and invalid B),

Winner is A, otherwise

Winner is B.

MSB accounts for the overflow of VFTs. If the difference between VFT value A and VFT value B exceeds the maximum VFT difference, the MSB is 1. A comparator selects the VFT value that is larger, as oppose to smaller, as the winner.

Figure 7:
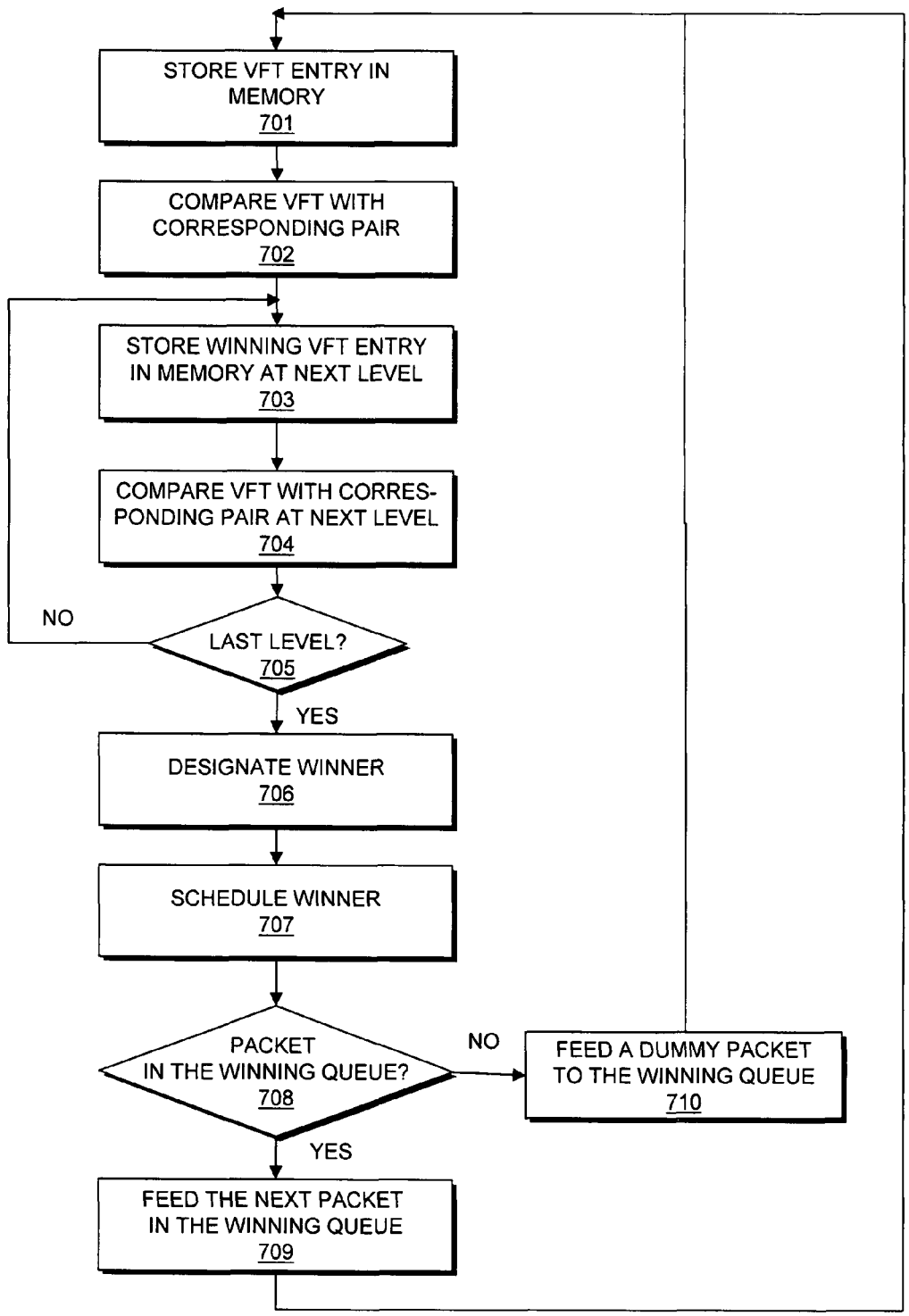
FIG. 7 is a flow chart illustrating a method for sorting virtual finish times according to an exemplary embodiment of the present invention.

FIG. 7 is a flow chart illustrating a method for sorting virtual finish time values according to an exemplary embodiment of the present invention. At 701, a received VFT entry is stored in memory at a level. The VFT entry may include a VFT value and a valid bit to indicate the validity of the VFT value. According to an embodiment of the present invention, the address of the memory used to store these values may be the queue ID of the received VFT entry. The VFT entry from an empty queue or a queue being blocked by configuration may be given an invalid state.

At 702, the VFT value is compared with its corresponding pair. According to an embodiment of the present invention, the corresponding pair may be a VFT value from a pre-designated sibling queue to the queue from which the VFT value received is from. The corresponding pair may be read from memory related to this level. In one embodiment, if the state for both a first and a second VFT values are invalid, the VFT value for the second VFT entry may be determined to be the smaller. If the first VFT value is valid and the second VFT value is invalid, the first VFT value is determined to be the smaller. If the first VFT value is invalid and the second VFT value is valid, the second VFT value is determined to be smaller. If both the first and second VFT values are valid and the most significant bit of the difference between the first and second VFT value is 1, the first VFT value is determined to be smaller. Otherwise, the second VFT value is determined to be smaller. The smaller VFT value is designated as the winner.

At 703, the VFT entry corresponding to the winning VFT value is stored in memory at a next level. The VFT entry stored may include the VFT value, a valid bit to indicate the validity of the VFT value, and a bit path that indicates the branch which the VFT entry originated from. The address in memory used to store the values may be derived from the ID of the winner in this level.

At 704, the VFT entry corresponding to the winning VFT is transmitted to a comparator at the next level and compared with its corresponding pair. According to an embodiment of the present invention, the corresponding pair may be a winning VFT value from pre-designated sibling queue(s) to the queue from which the VFT value received is from. The comparison performed at 704 may be similar to the comparison performed at 702.

At 705, it is determined whether the comparison performed was performed at the last level. If the comparison was performed at the last level, control proceeds to 706. If the comparison performed was not performed at the last level, control returns to 703.

At 706, the VFT entry corresponding to the winning VFT is designated as the winner. The winner has the smallest valid VFT value among the VFT values compared.

At 707, the data packet corresponding to the winner VFT is scheduled out. According to an embodiment of the present invention, this procedure may be performed by a scheduler controller.

At 708, it is determined whether there is an additional packet in the winning queue. If it is determined that there is another packet in the queue, control proceeds to 709. If it is determined that there is not another packet in the queue, control proceeds to 710. According to an embodiment of the present invention, this procedure may be performed by a scheduler controller.

At 709, the next packet in the winning queue is fed in. According to an embodiment of the present invention, the scheduler controller feeds the next packet to the sorting unit. Control returns to 701.

At 710, a dummy packet is fed into the winning queue. According to an embodiment of the present invention, the scheduler controller feeds a dummy packet to the winning queue which is later fed to the sorting unit. The validity bit of the dummy packet is set to 0. The dummy packet invalidates the winning VFT entry in sorting unit. According to one embodiment, the winning VFT entries stored in memory at 701 and 703 are invalidated. Control returns to 701.

According to an embodiment of the present invention, procedures listed at 701-710 may be performed in parallel in a pipelined fashion. FIG. 7 is a flow chart illustrating a method for sorting VFT values according to embodiments of the present invention. The techniques illustrated in these figures may be performed sequentially, in parallel or in an order other than that which is described. The techniques may be also be performed one or more times. It should be appreciated that not all of the techniques described are required to be performed, that additional techniques may be added, and that some of the illustrated techniques may be substituted with other techniques.

Figure 8A:
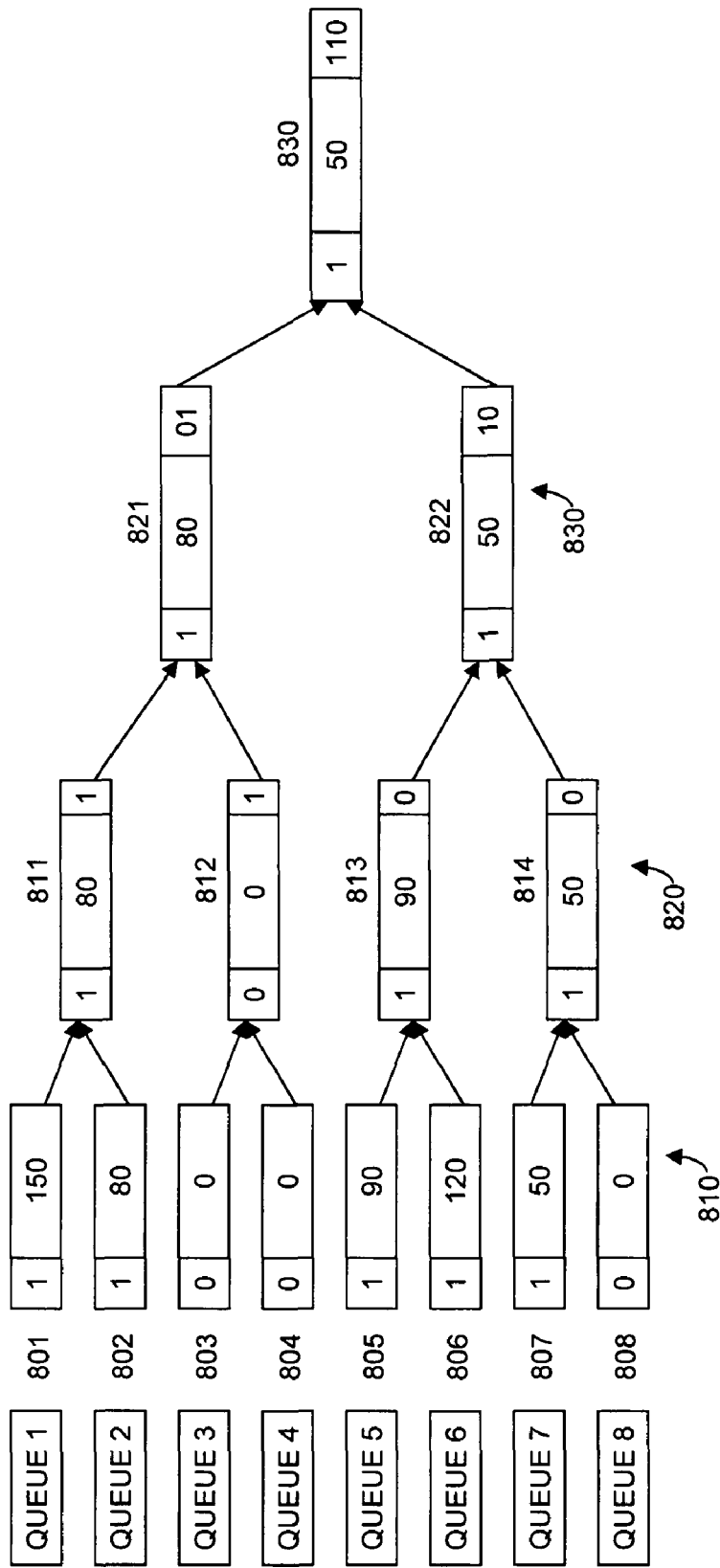
FIGS. 8a and 8b illustrate examples of sorting virtual finish time values according to an exemplary embodiment of the present invention.
Figure 8B:
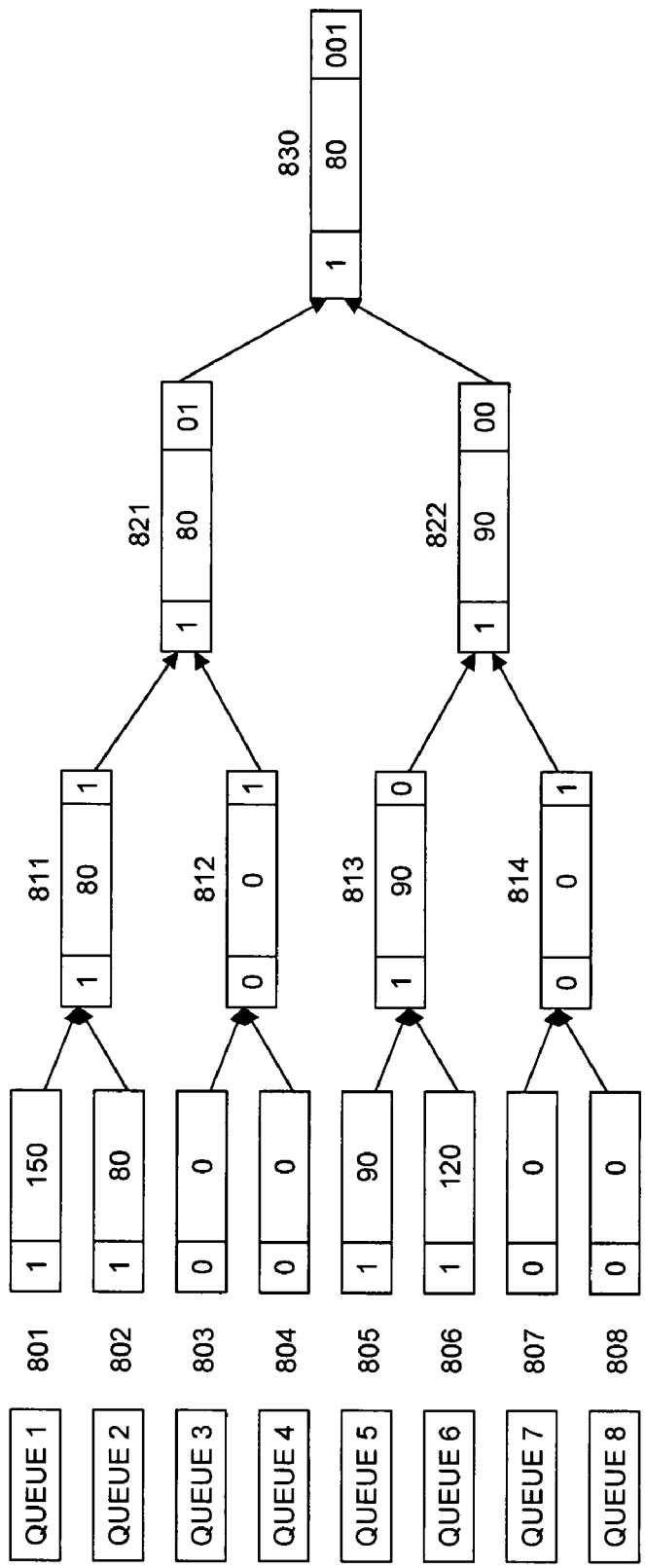

FIGS. 8a-8b illustrate examples of a method for sorting VFT values according to an embodiment of the present invention. These examples illustrates n levels of comparisons performed by n comparators, where n is 3. The maximum VFT difference in this example is 127. FIG. 8a illustrates a status of a sorting unit, such as sorting unit 300 illustrated in FIG. 3 at one moment in time. The values shown in FIGS. 8a and 8b are the result of executing the procedures illustrated in FIG. 7 several times. FIG. 8b illustrates the changes in the status of a sorting unit after a new packet arrives. In FIG. 8a, column 810 illustrates a plurality of VFT entries. The VFT entries are at level 3. The VFT entries 801-808 store the VFT values corresponding to the data packets at the top of queue 1 to queue 8, respectively. The VFT entries 801-808 are stored in a level 3 memory, and are compared by a level 3 comparator. The VFT entries at level 3 include a valid bit and a VFT value. The valid bit may have a value 1 to indicate that the VFT value is valid or a value of 0 to indicate that the VFT value is invalid.

The status of the sorting unit illustrated in FIG. 8a shows that the level 3 comparator has compared the VFT value from 801 with the VFT value from 802. The VFT value from 802 is the winner. The level 3 comparator has compared the VFT value from 803 with the VFT value from 804. Both VFT values are invalid. The VFT value from 804 is the winner. The level 3 comparator has compared the VFT value from 805 with the VFT value from 806. The VFT from 805 is the winner. The level 3 comparator has compared the VFT value from 807 with the VFT value from 808. The VFT value from 808 is invalid. The VFT value from 807 is the winner.

Column 820 illustrates a plurality of VFT entries. The VFT entries are at level 2. The VFT entries 811-814 are stored in a level 2 memory, and are compared by a level 2 comparator. The VFT entries at level 2 include a valid bit, a VFT value, and a one-bit path. The VFT entry at 811 was the winner from 802. The VFT entry at 811 includes a one-bit path value of 1 to indicate that it originated from the second of two branches. The VFT entry at 812 was the winner at 804. Since 804 stored an invalid VFT value, the VFT entry at 812 also indicates the invalidity of the VFT value. The VFT entry at 812 includes a one-bit path value of 1 to indicate that it originated from the second of two branches. The VFT entry at 813 was the winner at 805. The VFT entry at 813 includes a one-bit path value of 0 to indicate that it originated from the first of two branches. The VFT entry at 814 was the winner from 807. The VFT entry at 814 includes a one-bit path value of 0 to indicate that it originated from the first of two branches.

The level 2 comparator has compared the VFT value from 811 with the VFT value from 812. The value from 811 is the winner. The level 2 comparator has compared the VFT value from 813 with the VFT value from 814. The value from 814 is the winner.

Column 830 includes a plurality of VFT entries. The VFT entries are at level 1. The VFT entries 821-822 are stored in a level 1 memory, and are compared by a level 1 comparator. The VFT entries at level 1 include a valid bit, a VFT value, and a two-bit path. The VFT entry at 821 was the winner at 811. It includes a two-bit path value of 01 to indicate that it originated from the first of two branches, and the second of two branches prior. The VFT entry at 822 was the winner at 814. It includes a two-bit path value of 10 to indicate that it originated from the second two branches, and the first of two branches prior.

The status of the sorting unit illustrated in FIG. 8a shows that the level 3 comparator has compared the VFT value from 821 with the VFT value from 822. The value from 822 is the winner. It has a three-bit path value of 110 to indicate that it originated from the second of two branches, the second of two branches prior, and the first of two branches prior.

The winner originating from queue 7 has been identified in FIG. 8a. A scheduler controller may issue a scheduling slot to schedule the winner originating from queue 7. The scheduler may then request a next packet from queue 7. If there are no packets in the queue, an invalid packet is fed to the sorter. The VFT entry for the invalid packet would have a VFT valid bit of 0 and the VFT value may be 0.

FIG. 8b, illustrates the VFT entry for a dummy packet fed into 807. The previous winner originating from queue 7 is invalidated and how the sorter unit determines a next winner from queue 2. With reference to FIG. 7, at 701, a new VFT entry is stored in a seventh location in level 3 memory 807. The new VFT has valid bit of 0 and VFT value of O.

At 702, a level 3 comparator compares the new VFT entry with its corresponding pair at 808, which is read from an eighth location in level 3 memory. The winner is entry 808 because both entries are invalid.

At 703, the winning VFT entry is stored in a fourth location 814 in level 2 memory.

At 704, a level 2 comparator compares the winning VFT entry with its corresponding pair 813. Since entry 813 has valid bit of 1 and entry 814 has valid of 0, the entry 813 is the new winning VFT entry.

At 705, level 2 is not the last level. Control returns to 703.

At 703, the winning VFT is stored in the second location 822 in level 1 memory.

At 704, the level 1 comparator compares the winning VFT entry with its corresponding pair which is stored in entry 821. Since both entry 821 and entry 822 are valid, and their difference, 10, is smaller than the maximum VFT difference 127, the data packet with smaller VFT value is the winner.

At 705, level 1 is the last level.

At 706, the entry originating from 802 is designated as the winner.

At 707, the scheduler controller schedules the data packet corresponding to the winning VFT entry.

At 708, the scheduler controller checks the status of queue 2. If there is an additional packet in queue 2, the packet in queue 2 is fed in the sorting unit pursuant to 709. If there is no additional packet in queue 2, a dummy packet with validity bit 0 is fed to queue 2 in the sorting unit pursuant to 710. This dummy packet invalidates the winner originating from 802 and queue 2.

FIGS. 8a and 8b illustrate that the valid bit makes empty queues lose comparison in the sorting unit. Empty queues cannot share bandwidth until new packets arriving empty queues. Consequently, Spare bandwidth is allocated to rest busy queues proportional to their bandwidth weight.

According to an embodiment of the present invention, the comparators in the sorting unit work concurrently in a pipelined fashion. For example, with reference to FIG. 8b, when the data flow goes to 703 when the level 3 comparator completes its comparison, another data packet may be fed into the sorting unit. Another execution of the procedures illustrated in FIG. 7 may begin while execution of previous procedures are still in process. In this fashion, comparators 311-313 work concurrently.

According to an embodiment of the present invention, overflow may be accounted for by the sorting unit. In this embodiment, if the difference between a first VFT value and a second VFT value exceeds a predetermined number, a comparator selects the VFT value that is larger, as oppose to smaller, as the winner.

Figure 9:
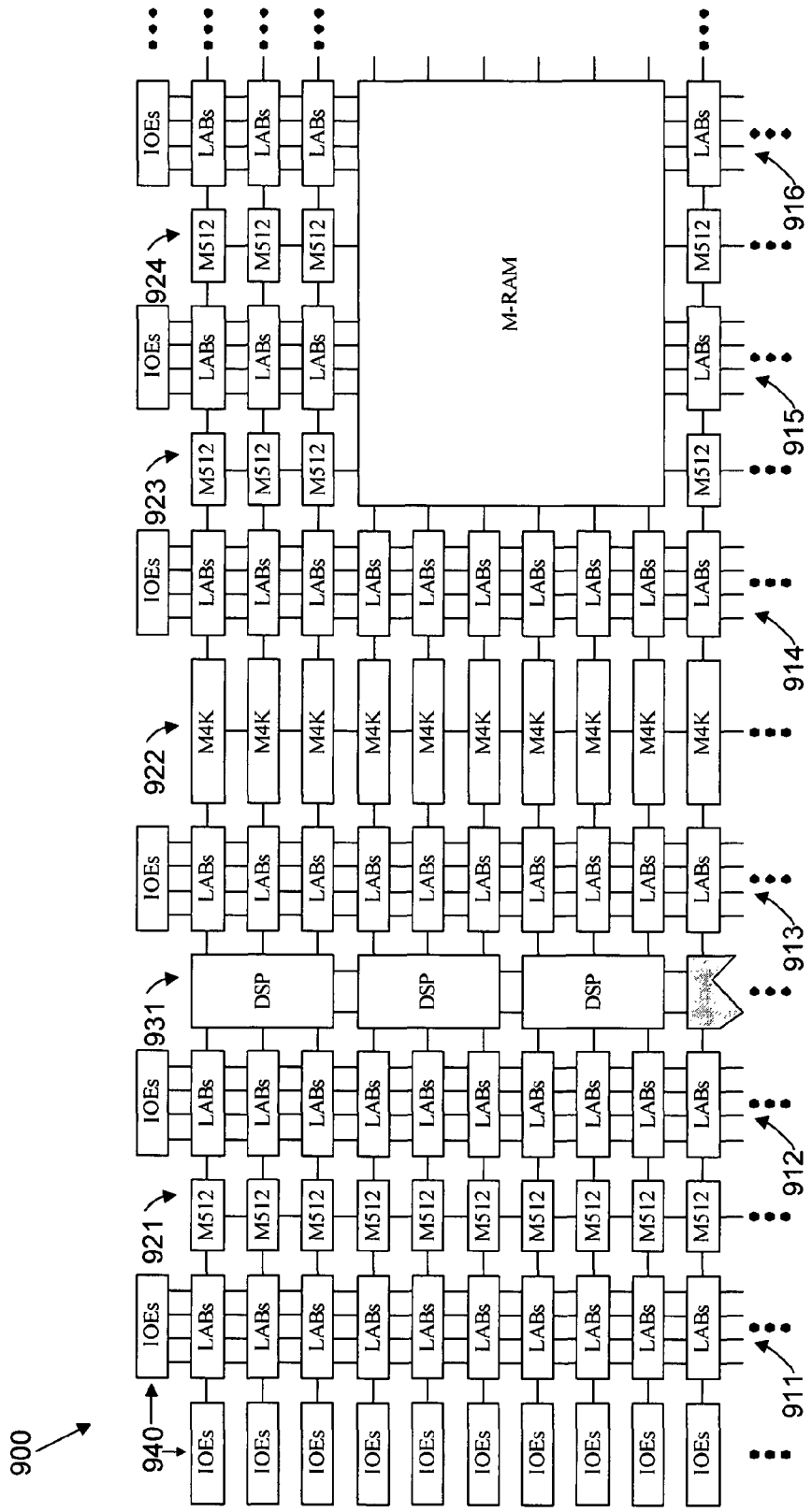
FIG. 9 illustrates an exemplary target device used for implementing a scheduler according to an exemplary embodiment of the present invention.

FIG. 9 illustrates an exemplary target device 900 in which a scheduler may be implemented according to an exemplary embodiment of the present invention. The target device 900 includes a plurality of logic-array blocks (LABs). Each LAB may be formed from a plurality of logic blocks, carry chains, LAB control signals, look up table (LUT) chain, and register chain connection lines. A logic block is a small unit of logic providing efficient implementation of user logic functions. A logic block includes one or more combinational cells, where each combinational cell has a single output, and registers. According to one embodiment of the present invention, the logic block may operate similarly to a logic element (LE), such as those found in Stratix™ manufactured by Altera® Corporation, or a combinational logic block (CLB) such as those found in Virtex™ manufactured by Xilinx® Inc. In this embodiment, the logic block may include a four input lookup table (LUT) with a configurable register. According to an alternate embodiment of the present invention, the logic block may operate similarly to an adaptive logic module (ALM), such as those found in Stratix™ II manufactured by Altera® Corporation. LABs are grouped into rows and columns across the target device 900. Columns of LABs are shown as 911-916. It should be appreciated that the logic block may include additional or alternate components.

The target device 900 includes memory blocks. The memory blocks may be, for example, dual port random access memory (RAM) blocks that provide dedicated true dual-port, simple dual-port, or single port memory up to various bits wide at up to various frequencies. The memory blocks may be grouped into columns across the target device in between selected LABs or located individually or in pairs within the target device 900. Columns of memory blocks are shown as 921-924.

The target device 900 includes digital signal processing (DSP) blocks. The DSP blocks may be used to implement multipliers of various configurations with add or subtract features. The DSP blocks include shift registers, multipliers, adders, and accumulators. The DSP blocks may be grouped into columns across the target device 900 and are shown as 931.

The target device 900 includes a plurality of input/output elements (IOEs) 940. Each IOE feeds an I/O pin (not shown) on the target device 900. The IOEs are located at the end of LAB rows and columns around the periphery of the target device 900. Each IOE includes a bidirectional I/O buffer and a plurality of registers for registering input, output, and output-enable signals. When used with dedicated clocks, the registers provide performance and interface support with external memory devices.

The target device 900 includes LAB local interconnect lines (not shown) that transfer signals between LEs in the same LAB. The LAB local interconnect lines are driven by column and row interconnects and LE outputs within the same LAB. Neighboring LABs, memory blocks, or DSP blocks may also drive the LAB local interconnect lines through direct link connections.

The target device 900 also includes a plurality of row interconnect lines ("H-type wires") (not shown) that span fixed distances. Dedicated row interconnect lines, route signals to and from LABs, DSP blocks, and memory blocks within the same row. The row interconnect lines may span a distance of up to four, eight, and twenty-four LABs respectively, and are used for fast row connections in a four-LAB, eight-LAB, and twenty-four-LAB. The row interconnects may drive and be driven by LABs, DSP blocks, RAM blocks, and horizontal IOEs.

The target device 900 also includes a plurality of column interconnect lines ("V-type wires") (not shown) that operate similarly to the row interconnect lines. The column interconnect lines vertically routes signals to and from LABs, memory blocks, DSP blocks, and IOEs. Each column of LABs is served by a dedicated column interconnect, which vertically routes signals to and from LABs, memory blocks, DSP blocks, and IOEs. The column interconnect lines may traverse a distance of four, eight, and sixteen blocks respectively, in a vertical direction.

FIG. 9 illustrates an exemplary embodiment of a target device. It should be appreciated that a system may include a plurality of target devices, such as that illustrated in FIG. 9, cascaded together. It should also be appreciated that the target device may include programmable logic devices arranged in a manner different than that on the target device 900. A target device may also include FPGA resources other than those described in reference to the target device 900. Thus, while the invention described herein may be utilized on the architecture described in FIG. 9, it should be appreciated that it may also be utilized on different architectures, such as those employed by Altera® Corporation in its APEX™, Stratix™, Cyclone™, Stratix™ II, Stratix™ III, Cyclone™ II, Cyclone™ III families of chips and those employed by Xilinx® Inc. in its Virtex™, Virtex™ II, Virtex™ II-PRO, Virtex IV™, Virtex V™, and Spartan-3 line of chips.

In the foregoing specification embodiments of the invention has been described with reference to specific exemplary embodiments thereof. It will, however, be evident that various modifications and changes may be made thereto without departing from the broader spirit and scope of the embodiments of the invention. The specification and drawings are, accordingly, to be regarded in an illustrative rather than restrictive sense.

What is claimed is:

1. A scheduler comprising:
a sorting unit that includes an n number of comparators to identify a smallest virtual finish time (VFT) value from $2^n$ VFT entries, wherein one entry of the VFT entries includes a valid bit for indicating validity status associated therewith, wherein each of the n number of comparators is operable to compare a first VFT value with a second VFT value, and wherein the first VFT value is determined to be a smaller of the VFT values if the first and second VFT values are valid and a most significant bit of the difference between the first and second VFT value is 1.

2. The scheduler of claim 1, wherein the n number of comparators form a comparator tree of n levels and each of the n levels has a single dedicated comparator from the n number of comparators to compare one or more pairs of VFT values at each level to identify a smaller VFT value from each of the one or more pairs.

3. The scheduler of claim 1, wherein the n number of comparators at the n levels operate in parallel in a pipelined fashion.

4. The scheduler of claim 1, wherein each of the n comparators compares a first VFT value with a second VFT value and if the first VFT value is valid and the second VFT value is invalid, the first VFT value is determined to be the smaller of the VFT values.

5. The scheduler of claim 2 further comprising:
a level n memory to store the $2^n$ VFT entries at level n;
a level n−1 memory to store the smaller $2^{n-1}$ VFT entries at level n−1; and
a level n−2 memory to store the smaller $2^{n-2}$ VFT entries at level n−2.

6. The scheduler of claim 2 further comprising a memory to store the smaller VFT values identified at each level.

7. The scheduler of claim 2, wherein a memory stores a valid bit of a VFT value and a bit path identifying a branch where a corresponding VFT value originates from.

8. The scheduler of claim 1 further comprising a calculator unit to compute VFT values of packets.

9. The scheduler of claim 8, wherein a VFT value of a packet is determined from a virtual start time of the packet, a length of the packet, and a bandwidth of a network to be scheduled on.

10. The scheduler of claim 9, wherein the virtual start time of a packet is a VFT value of a previous packet in the scheduler's queue.

11. The scheduler of claim 9, wherein the virtual start time of a packet is its global virtual time.

12. The scheduler of claim 1 further comprising a scheduler controller operable to transmit a dummy data packet into a queue with no packet stored therein, and wherein the scheduler controller is operable to set a valid bit to invalid to indicate that there is no packet in the queue.

13. A scheduler comprising:
a sorting unit that includes an n number of comparators to form a comparator tree of n levels, where each of the n levels has a single dedicated comparator operable to compare one or more virtual finish time (VFT) pairs from $2^n$ VFT entries to identify a smallest VFT value of a valid VFT entry, wherein a first level of the comparator tree performs a comparison on each of the $2^n$ VFT entries and each subsequent level of the comparator tree performs a comparison on a different combination of a subset of the $2^n$ VFT entries, and wherein each of the n levels has only a single comparator.

14. The scheduler of claim 13, wherein the n comparators at the n levels operate in parallel in a pipelined fashion.

15. The scheduler of claim 13, further comprising:
a level n memory operable to store the $2^n$ VFT entries at level n;
a level n−1 memory operable to store the smaller $2^{n-1}$ VFT entries at level n−1; and
a level n−2 memory operable to store the smaller $2^{n-2}$ VFT entries at level n−2.

16. The scheduler of claim 13, further comprising a memory operable to store smaller VFT values identified at each level.

17. The scheduler of claim 16, wherein the memory is also operable to store a valid bit of a VFT value and a bit path identifying a branch where a corresponding VFT value originates from.

18. The scheduler of claim 13, wherein the scheduler further comprises a calculation unit operable to compute VFT values of packets.

19. The scheduler of claim 18, wherein a VFT value of a packet is determined from a virtual start time of the packet, a length of the packet, and a bandwidth of a network to be scheduled on.

20. The scheduler of claim 13 further comprising a scheduler controller operable to transmit a dummy data packet into a queue with no packet stored therein, and wherein the scheduler controller is operable to set a valid bit to invalid to indicate that there is no packet in the queue.

21. The scheduler of claim 13, wherein each comparator at each level of the n levels is operable to compare a larger number of VFT pairs than a comparator at a next level on the comparator tree.

22. A method for scheduling comprising:
comparing one or more pairs of virtual finish time (VFT) values at a first level of an nth level scheduler using a single dedicated comparator to identify valid VFT values with a smaller of the VFT values in the pairs where the scheduler is implemented with an n number of comparators; and
repeatedly comparing a different combination of the identified VFT values at subsequent next levels using a single dedicated comparator associated with each subsequent next level therewith until a last level is reached and a smallest valid VFT value is determined, wherein the level and each level of the subsequent next levels of the scheduler each have only a single comparator.

23. The method of claim 22, wherein the comparators at the n levels operate in parallel in a pipelined fashion.

24. The method of claim 22 further comprising storing a smaller of the VFT values identified at each level in a memory.

25. The method of claim 22 further comprising storing a valid bit of a VFT value and a bit path identifying a branch where a corresponding VFT value originates from in a memory.

26. The method of claim 22 further comprising computing VFT values of packets.

27. The method of claim 22, wherein a VFT value of a packet is determined from a virtual start time of the packet, a length of the packet, and a bandwidth of a network to be scheduled on.

28. The scheduler of claim 12, wherein the valid bit set to invalid invalidates a previously determined smallest VFT value from the queue.

29. The scheduler of claim 20, wherein the valid bit set to invalid invalidates a previously determined smallest VFT value from the queue.

30. The method of claim 22, further comprising transmitting a dummy data packet into a queue with no packet stored therein, and setting a valid bit to invalid to indicate that there is no packet in the queue.

31. The method of claim 30, wherein the valid bit set to invalid invalidates a previously determined smallest VFT value from the queue.

32. The method of claim 22, wherein the comparator at the nth level of the scheduler compares a larger number of VFT pairs than a comparator at the next level of the scheduler.

* * * * *